United States Patent Office 3,752,647
Patented Aug. 14, 1973

3,752,647
WATER SWOLLEN CELLULOSE AND BLENDS DYED WITH INSOLUBLE, NON-VATTABLE ANTHRAQUINONE DYES IN A GLYCOL ETHER SOLUTION
Robert George Mentzer, Wilmington, Del., assignor to E. I. du Pont de Nemours and Company, Wilmington, Del.
No Drawing. Filed July 30, 1971, Ser. No. 167,829
Int. Cl. C09b 5/62; D06p 3/82
U.S. Cl. 8—21 C
9 Claims

ABSTRACT OF THE DISCLOSURE

Water swellable cellulosic fibers, for example, cotton, or blends or mixtures thereof with synthetic fibers, for example, polyester fibers, uniformly dyed to blue shades with essentially water insoluble N,N',N''-substituted-1,4,5-(or 8-)-triaminoanthraquinone dyes, for example, 1-benzamido-4,5-bis(p-toluidino)anthraquinone, said dyed fibers being fast to light, washing, drycleaning, crocking and sublimation.

BACKGROUND OF THE INVENTION

(1) Field of the invention

This invention relates to uniformly dyed water swellable cellulosic fibers and to dyed mixtures or blends of such water swellable cellulosic fibers and synthetic fibers.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process is U.S. Pat. 3,313,590. Analogous to the dyeing of such blends and confirming the aforesaid distinction between water swellable cellulosic materials and non-water swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in Textile Research Journal, 32, 331–337 (1962) report that cotton can be swollen with water containing both high boiling, water soluble, non-reactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913, issued Jan. 25, 1944, to Hanford and Holmes. The cellullosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

(1) Water in an amount sufficient to swell the cellulose;
(2) A preformed dye in an amount sufficient to color the cellulose, a boiling saturated solution of which dye in 0.1 molar aqueous sodium carbonate exhibits an optical absorbance not in excess of about 30; and
(3) A solvent in an amount sufficient to maintain swelling of the cellulose if water is removed, and which
(a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula

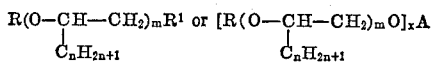

wherein $n$ is 0 or 1;
$m$ is a positive whole number;
R is H, $C_{1-8}$ alkyl, $C_{7-15}$ aralkyl or alkyl,

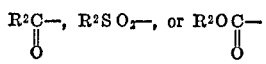

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;
$R^1$ is —OH, —$OR^2$, —$SR^2$, —$NHR^2$, —$NR^2(C_{1-8}$ alkyl), —$NR^2(C_{7-15}$ aralkyl or alkaryl),

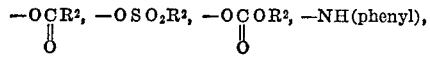

or —NH(naphthyl), wherein $R^2$ is as defined above;
$x$ is the number of unsatisfied valencies in A; and
A is $ROCH_2CHORCH_2$—, —$CH_2CHORCH_2$—,

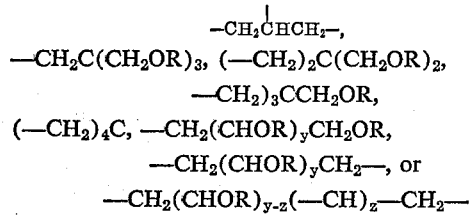

—$CH_2C(CH_2OR)_3$, (—$CH_2)_2C(CH_2OR)_2$,

—$CH_2)_3CCH_2OR$, (—$CH_2)_4C$, —$CH_2(CHOR)_yCH_2OR$,

—$CH_2(CHOR)_yCH_2$—, or

—$CH_2(CHOR)_{y-z}$(—CH)$_z$—$CH_2$— in which $y$ is 2, 3, or 4; $z$ is 0, 1, 2, 3 or 4 but no greater than $y$; and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

U.S. Pat. 3,473,882 discloses the dyeing of polyalkylene terephthalate fibers with anthraquinone dyes such as those having the formulas

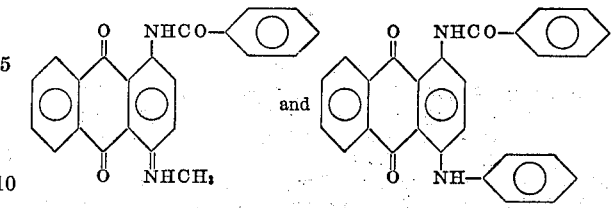

OBJECTS AND SUMMARY OF THE INVENTION

It is an object of the present invention to provide uniformly dyed fibers. A further object is to provide uniformly dyed water swellable cellulosic fibers and uniformly dyed blends or mixtures of water swellable cellulosic fibers and synthetic fibers. Still another object is to provide uniformly dyed blue fibers which exhibit good fastness to light, washing, drycleaning, crocking and sublimation.

The present invention resides in uniformly dyed blue water swellable cellulosic fibers or blends or mixtures of water swellable cellulosic fibers and synthetic fibers, said dyed fibers being fast to washing, drycleaning, light, crocking and sublimation, wherein said dyed fibers the dye comprises the anthraquinone dye having the formula

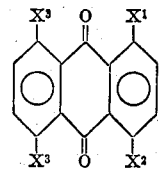

wherein $X^1$ is NHCO(D) or $NHSO_2$(D) wherein D is $C_{1-18}$ alkyl, naphthyl, unsubstituted phenyl or phenyl substituted with $C_{1-4}$ alkyl, $C_{1-4}$ alkoxy, Cl, Br, $CF_3$ or $NO_2$;
one of $X^3$ is H;
$X^2$ and the other $X^3$ contain 6–18 carbon atoms each and are selected from NH(alkyl), NH(cyclohexyl), (N(alkyl)$_2$ and NH($R^1$) wherein $R^1$ is unsubstituted phenyl or phenyl substituted with 1 to 3 substituents selected from
(a) alkyl and alkoxy,
(b) F, Cl, Br, NHCO(alkyl) and NHCO($R^2$) wherein $R^2$ is unsubstituted phenyl or phenyl substituted with alkyl, alkoxy, halogen, $CF_3$, or $NO_2$, and
(c) $R^2$, $OR^2$, $CF_3$, CN, $CONH_2$, CONH(alkyl), CON(alkyl)$_2$, CONH($R^2$), $CONR^2$(alkyl), $SO_2NH_2$, $SO_2$NH(alkyl), $SO_2$NH($R^2$), $SO_2$N(alkyl)$_2$, $SO_2NR^2$(alkyl), CO(alkyl), CO($R^2$), $CO_2$(alkyl), $CO_2R^2$),
$SO_2$(alkyl), $SO_2(R^2)$ and N=$NR^2$ wherein $R^2$ is as defined in (b), provided that the total number of substituents, from (b) shall not exceed two and from (c) shall not exceed one, and provided further that the 6-position of $R^1$ is substituted with H, or if the 2-position is substituted with $C_{1-2}$ alkyl, then with H or $C_{1-2}$ alkyl.

Fibers dyed with the dyes prepared by Experiments 1, 11, 12, 13 and 15 herein represent preferred dyed fibers.

DETAILED DESCRIPTION OF THE INVENTION

The aforesaid anthraquinone dyes which are used in the preparation of the dyed fibers of this invention are prepared by conventional processes and techniques. As an example of such processes and techniques, an amine, such as listed in Table 1, can be condensed with a 1-acylamino- 4,5-(or 4,8-)dihaloanthraquinone. Chlorine is the preferred halogen, for economic reasons, although the bromo derivative is also operable. The condensation can be carried out by heating the reactants together in a suitable solvent, such as nitrobenzene, o-dichlorobenzene or an excess of the amine itself. It is advantageous to have an inorganic acid acceptor present, such as potassium acetate or sodium carbonate or a mixture thereof. Copper, a copper salt or a mixture thereof can also be used to promote the reaction, if desirable.

TABLE 1

| | |
|---|---|
| n-Hexylamine | Orthanilamide |
| n-Dodecylamine | 3,4-diethoxyaniline |
| n-Octadecylamine | Cresidine |
| N,N-di-n-propylamine | 3-isopropyl-4-anisidine |
| N,N-di-n-hexylamine | o-, m- or p-Fluoroaniline |
| N,N-di-n-nonylamine | o-, m- or p-Chloroaniline |
| Cyclohexylamine | o-, m- or p-Bromoaniline |
| 4-n-octylcyclohexylamine | m-Aminobenzotrifluoride |
| Aniline | 2,3-, 2,4-, 2,5- or 3,5-dichloroaniline |
| o-, m- or p-Toluidine | 2-chloro-5-trifluoromethylaniline |
| o-, m- or p-Ethylaniline | 2-chloro-4-methylaniline |
| p-n-Butylaniline | 2-chloro-5-methylaniline |
| p-n-Octylaniline | 3-chloro-2-methylaniline |
| p-n-Dodecylaniline | 3-chloro-4-methylaniline |
| o-, m- or p-Anisidine | 4-chloro-2-methylaniline |
| o-, m- or p-Phenetidine | 5-chloro-2-methylaniline |
| p-Butoxyaniline | 2-chloro-5-methoxyaniline |
| 2,3-, 2,4-, 2,5-, 3,4- or 3,5-Xylidine | 5-chloro-2-methoxyaniline |
| 2,4-, 2,5- or 3,5-dimethoxyaniline | 2-toluidine-4-(N-butylsulfonamide) |
| 3,4,5-trimethoxyaniline | 2-anisidine-5-(N,N-dimethylsulfonamide) |
| 4-fluoro-2-methylaniline | |
| 5-fluoro-2-methylaniline | Sulfanil-(p-anisidide) |
| 4-chloro-2,5-dimethoxyaniline | Metanil-(N-butylanilide) |
| 5-chloro-2,4-dimethoxyaniline | p-Aminoacetophenone |
| p-Aminoacetanilide | p-Aminobenzophenone |
| p-Aminododecanoylanilide | p-Octylsulfonylaniline |
| 4'-aminobenzanilide | m-Aminobenzoic acid, propyl ester |
| 3'-amino-4-t.-butylbenzanilide | 4-amino-3-bromobenzophenone |
| p-Aminobiphenyl | 4-amino-4'-nitrobenzophenone |
| m- or p-Phenoxyaniline | p-Aminobenzoic acid, p-chlorophenyl ester |
| m-Cyanoaniline | 4-(p-butoxyphenylsulfonyl)-3-ethylaniline |
| 3-amino-5-chlorobenzamide | |
| Anthranilic acid, n-octylamide | 2,5-dimethoxy-4-(phenylsulfonyl)-aniline |
| p-Aminobenzoic acid, N,N,-diethylamide | |
| 5-amino-2-chlorobenzanilide | p-(Phenylazo)aniline |
| p-Aminobenzoic acid, N-methylanilide | 4-(p-nitrophenylazo)-2-methoxy-5-methylaniline |
| p-Aminobenz(p-n-hexylanilide) | |

The 1-acylamino-4,5 - (or 4,8-)dichloroanthraquinones can be obtained by acylating 1-amino-5-(or 8-)chloroanthraquinone with an acyl chloride, such as listed in Table 2. The resulting 1-acylamino-5-(or 8-)chloroanthraquinone can then be chlorinated by treating with chlorine in a suitable solvent, such as o-dichlorobenzene (ODCB), in the presence of acetic acid and sodium acetate. The 4,5-(or 4,8-)dichlorinated product is obtained in moderate yield.

TABLE 2

| | |
|---|---|
| Acetyl chloride | p-n-Butoxybenzoyl chloride |
| Caproyl chloride | o-, m- or p-Anisyl chloride |
| Decanoyl chloride | p-Toluenesulfonyl chloride |
| Stearyl chloride | p-Methoxybenzenesulfonyl chloride |
| Methanesulfonyl chloride | o-, m- or p-Chlorobenzoyl chloride |
| n-Hexanesulfonyl chloride | o-, m- or p-Chlorobenzenesulfonyl chloride |
| n-Octadecanesulfonyl chloride | |
| 1- or 2-naphthoyl chloride | m- or p-Nitrobenzoyl chloride |
| 1- or 2-naphthalenesulfonyl chloride | m- or p-Nitrobenzenesulfonyl chloride |
| Benzoyl chloride | o-, m- or p-Trifluoromethylbenzoyl chloride |
| Benzenesulfonyl chloride | |
| p-t.-Butylbenzoyl chloride | o-, m- or p-Bromobenzoyl chloride |
| o-, m- or p-Toluoyl chloride | p-Bromobenzenesulfonyl chloride |

As a further example of such conventional processes and techniques, the dyes employed in this invention can be obtained by heating a 1-acylamino-4,5-(or 4,8-)dinitroanthraquinone with an amine, such as in Table 1, in a suitable solvent, such as ODCB or nitrobenzene, and advantageously in the presence of an acid acceptor, such as sodium carbonate or sodium acetate or a mixture thereof.

1-acylamino - α - bis(2,6-disubstituted anilino) anthraquinone dyes, which are not readily made by the processes described above, can be prepared by reducing 1-acylamino - 4,5 - (or 4,8-)dinitroanthraquinone with a reducing agent, such as sodium hydrosulfite, to give the corresponding diaminoanthraquinone. These compounds may then be condensed with a bromophenyl derivative such as 1 - bromo-2,4,6-trimethylbenzene, 1-bromo-2,4,6-triethylbenzene, 2-bromo-1,3-dimethylbenzene or 2-bromo-1-ethyl-3,5-dimethylbenzene, to give the desired dye or mixture of dyes. The condensation reaction is carried out by heating the reactants together in a suitable organic solvent in the presence of acid-binding agents such as an alkali metal carbonate and/or acetate. Copper and/or a salt therof may also be used to accelerate the reaction.

The dinitro intermediates can be obtained by nitrating 1-aminoanthraquinone by conventional procedures. For example, 1-phthalimidoanthraquinone can be nitrated in a sulfuric acid-nitric acid mixture and the phthalimido group in subsequently hydrolyzed with sulfuric acid. A mixture of 1-amino-4,5-dinitroanthraquinone and the 4,8-dinitro isomer is thus obtained. Acylation of the amine group can then be carried out with an acid chloride, such as listed in Table 2. The product obtained by condensation of this mixture with an amine, as described above, is a mixture of two dyes which exhibit slight differences in shade and solubility but which have almost identical application and fastness properties. Separation of the said dye mixture is both unnecessary and economically undesirable, 1 - phthalimido - 4,5 - (or 4,8-)bis(substituted amino)anthraquinones are violet dyes having utility in the dyeing procedures described herein.

The cellulosic materials which can be dyed with the dyes employed in this invention by the previously-described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with dilute aqueous caustic or the dyeing can be carried out in the presence of wetting agents, preferably of the nonionic type, which assist penetration of the fibers by the dye solvent. Mixtures of cotton and rayon fibers can be dyed, and the dyes employed herein also can be used to dye purified wood pulp and paper. Excluded as the water swellable cellulosic material, as considered herein, is cellulose acetate which does not exhibit the requisite swellability in the presence of water.

The synthetic materials which can be dyed with the dyes employed in this invention include polyesters, polyamides, cellulose ethers and esters, and copolymers and mixtures thereof with other components intended to make them more easily dyeable or to add other desirable properties. Many of the aforesaid dyes can be applied to synthetic materials by a conventional Thermosol dyeing procedure.

The dyes employed in this invention can be applied to water swellable cellulosic materials, or to blends or mixtures thereof with synthetic materials by the above-described Blackwell et al. process. The dyes employed in this invention are particularly useful for dyeing mixtures and blends of cotton and polyester or polyamide, such as mixtures containing 50 to 80% polyethylene terephthalate and 20 to 50% cotton. In such mixtures, the synthetic material is dyed using conventional process conditions.

Since the aforesaid dyes can be used to dye both components in a blend or mixture, scourability as a factor in dye selection is avoided since the previously-described cross-staining problem has been minimized.

The dyes employed in this invention dye the substrate directly, that is, they do not require oxidation, reduction, hydrolysis, or any other chemical modification for development of color or fastness. The dyes exhibit very little difference in shade on polyester and cotton and hence an outstanding balance of shade and strength can be attained on blend fabrics composed of these fibers. The dyes exhibit good fastness to light, crocking, washing, drycleaning and sublimation; many of the aforesaid dyes can be isolated in highly crystalline form and can be milled easily to fine aqueous dispersions. Others, particularly those containing long-chain alkyl groups, can be isolated as low-melting solids or oils.

In dyeing cellulosic materials with the aforesaid dyes using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dyebaths used in practicing this invention also can contain dyes other than those employed in this invention; for example, direct dyes or fiber reactive dyes for cotton or for polyamides can be present for shading purposes.

In the preferred dyeing procedure with the dyes employed in this invention, an aqueous dye dispersion and the organic solvent are applied to the fabric from a single padbath. The amount of water in the padbath usually is 70–95 weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

The dyes employed in this invention and which cannot be obtained as aqueous dispersions can be employed as solutions in the hot solvent, instead of as aqueous dispersions, in any of the aforesaid dyeing procedures. Alternatively, the dye can be employed as a solution in a low boiling auxiliary solvent, as defined by Blackwell et al., such as a halogenated hydrocarbon boiling below about 130° C.

The following experiments show the preparation of the dyes employed in this invention. All parts are by weight unless otherwise indicated.

EXPERIMENT 1

Preparation of 1-benzamido-4,5-bis(p-toluidino) anthraquinone

A mixture of 20 parts of 1-benzamido-4,5-dichloroanthraquinone, 10.7 parts of anhydrous sodium carbonate, 8.3 parts of anhydrous sodium acetate and 75 parts of p-toluidine was heated under nitrogen at 185–195° C. for 3 hours. The reaction mixture was allowed to cool to 90° C. and 100 parts of ethanol were added; the resultant suspension was allowed to stand overnight.

The solids were isolated by filtration and then reslurried in a mixture of 580 parts of water and 20 parts of sulfuric acid. The slurry was stirred at 80° C. for 1 hour, after which the solids were collected by filtration and washed with hot water until the washings no longer gave an acid reaction to Congo Red paper. Finally, the solids were washed with ethanol and dried; yield was 25 parts (91%). The red-blue solids melted at 227–229° C. After recrystallizing the crude dye twice from chloroform-ethanol, the solids had a melting point of 238.5–240° C. Thin layer chromatography (T.L.C.), using acetonitrile: benzene=1:19 as eluent, revealed a single blue compotent; $\lambda_{max.}$ 628 m$\mu$; $a_{max.}$ 28.8 liters gram$^{-1}$ cm.$^{-1}$ (in dimethylacetamide:water=4:1). Based on the above, the dye obtained was 1-benzamido-4,5-bis(p-toluidino) anthraquinone. The dye exhibited good balance and fastness to light, washing, drycleaning, crocking and sublimation on 65/35 polyester/cotton blend fabric. Fibers dyed with this dye represent a preferred embodiment of this invention.

EXPERIMENTS 2–10

The blue dyes of Experiments 2–10 were prepared by the procedure of Experiment 1 except that the 75 parts of p-toluidine were replaced with an equimolar quantity of another aromatic amine. The aromatic amines and the properties of the dyes obtained are shown in Table 3.

TABLE 3

| Experiment | Aromatic amine | Yield (percent) | Melting point (° C.) | $\lambda_{max.}$ (m$\mu$) | $a_{max.}$ (l.g.$^{-1}$ cm.$^{-1}$) |
|---|---|---|---|---|---|
| 2 | m-Toluidine | 72 | 192–195 | 618 | 27 |
| 3 | p-Anisidine | 85 | 244–246 | 630 | 26 |
| 4 | p-n-Butylaniline | 84 | 145–146 | 625 | 24 |
| 5 | Cresidine | 72 | 231–232 | 624 | 21.7 |
| 6 | Aniline | 98.5 | 238–240 | 610 | 27 |
| 7 | 2,4-xylidine | 80 | 135–137 | 610 | 22 |
| 8 | o-Toluidine | 68 | 209–211 | 610 | 23 |
| 9 | p-Aminoacetanilide | 79 | 265–270 | 630 | 21 |
| 10 | p-Chloroaniline | 43 | | 605 | 23.5 |

The dyes of Experiments 2–10 exhibited good balance and fastness to light, washing, drycleaning, crocking and sublimation on 65/35 polyester/cotton blend fabric.

EXPERIMENT 11

Preparation of 1-(p-nitrobenzamido)-4,5-bis (p-toluidino)anthraquinone

The procedure of Experiment 1 was repeated except that the 20 parts of 1-benzamido-4,5-dichloroanthraquinone were replaced by 20 parts of 1-(p-nitrobenzamido)-4,5-dichloroanthraquinone. A dull greenish dye was obtained in 94% yield; M.P. 230–232° C.; $\lambda_{max.}$ 622 m$\mu$; $a_{max.}$ 26 liters gram$^{-1}$ cm.$^{-1}$. Balance and fastness to light, washing, drycleaning, crocking and sublimation on 65/35 polyester/cotton blend were good. Based on the above, the dye obtained was 1-(p-nitrobenzamido)-4,5-bis(p-toluidino)anthraquinone. Fibers dyed with this dye represent a preferred embodiment of this invention.

EXPERIMENT 12

Preparation of 1-(p-anisylamino)-4,5-bis(p-toluidino) anthraquinone

The procedure of Experiment 1 was repeated except that the 20 parts of 1-benzamido-4,5-dichloroanthraquinone were replaced by 20 parts of 1-(p-anisylamino)-

4,5-dichloroanthraquinone. A blue dye was obtained in 95% yield; M.P. 208–210° C.; $\lambda_{max.}$ 625 m$\mu$; $a_{max.}$ 26.7 liters gram$^{-1}$ cm.$^{-1}$. Balance and fastness properties on 65/35 polyester/cotton blend were very good. Based on the above, the dye obtained was 1-(p-anisylamino)-4,5-bis(p-toluidino)anthraquinone. Fibers dyed with this dye represent a preferred embodiment of this invention.

EXPERIMENT 13

Preparation of 1-benzamido-4,8-bis(p-toluidino) anthraquinone

The procedure of Experiment 1 was repeated except that the 20 parts of 1-benzamido-4,5-dichloroanthraquinone were replaced by 20 parts of 1-benzamido-4,8-dichloroanthraquinone. A blue dye was obtained, having a redder shade than the isomeric dye of Example 1; yield was 97%; M.P. 280–282° C.; $\lambda_{max.}$ 606 m$\mu$; $a_{max.}$ 30.5 liters gram$^{-1}$ cm.$^{-1}$. Balance and fastness properties were good on polyester/cotton fabric. Based on the above, the dye obtained was 1-benzamido-4,8-bis(p-toluidino) anthraquinone. Fibers dyed with this dye represent a preferred embodiment of this invention.

EXPERIMENT 14

Preparation of 1-(p-t.-butylbenzamido)-4,5-bis(p-toluidino)anthraquinone

The procedure of Experiment 1 was repeated except that the 20 parts of 1-benzamido-4,5-dichloroanthraquinone were replaced by 20 parts of 1-(p-tert.-butylbenzamido)-4,5-dichloroanthraquinone. The dye product was obtained in 79% yield; M.P. 137–139° C.; $\lambda_{max.}$ 625 m$\mu$; $a_{max.}$ 25.7 liters gram$^{-1}$ cm.$^{-1}$. Blue shades of good balance and fastness properties were produced on 65/35 polyester/cotton blend fabric. Based on the above, the dye obtained was 1 - (p - t - butylbenzamido) - 4,5-bis(p-toluidino)anthraquinone.

EXPERIMENT 15

Preparation of a mixture of the dyes of Experiments 1 and 13

A mixture of 1-amino-4,5-dinitroanthraquinone and 1-amino-4,8-dinitroanthraquinone was obtained from the nitration of 1-aminoanthraquinone by well known prior art procedure.

Nitrobenzene (150 parts) was heated for 1 hour at 150° C. under a nitrogen purge. Forty parts of the aforesaid mixture of 1-amino-$\alpha$-dinitroanthraquinones were then added, followed by 21 parts of benzoyl chloride (added dropwise over a period of 10 minutes). The reaction mixture was stirred at 150° C. for 5 hours. An additional 2 parts of benzoyl chloride were added and the reaction mixture was stirred at 150° C. for one hour. The mix was allowed to cool to 90° C.; 80 parts of isopropanol then were added and the mix was allowed to stand overnight. The solids were isolated by filtration, washed with isopropanol and dried; yield of yellow intermediate was 40 parts (75%); M.P. 262–265° C. Thin layer chromatography (eluent, acetonitrile:benzene=15:85 on a volume basis) revealed two yellow spots; $R_f$ values 0.43 and 0.53. Calc'd for $C_{21}H_{11}N_3O_7$: C, 60.2; H, 2.7; N, 10.1. Found: C, 60.6; H, 3.1; N, 9.8.

The procedure of Exeriment 1 was then repeated except that the 20 parts of 1 - benzamido-4,5-dichloroanthraquinone were replaced by 20 parts of the aforesaid intermediate (mixture of isomeric 1 - benzamido-$\alpha$-dinitroanthraquinone). The dye product was obtained in 71% yield; M.P. 205°–210° C.; $\lambda_{max.}$ 610 m$\mu$; $a_{max.}$ 27.1 liters gram$^{-1}$ cm.$^{-1}$. The visible spectrum curve indicated that the mixture contained about 30% of the dye of Experiment 1 and about 70% of the dye of Experiment 12. Balance and fastness properties of the mixture on 65/35 polyester/cotton blend were comparable to those of the individual dyes. Fibers dyed with this dye mixture represent a preferred embodiment of this invention.

EXPERIMENT 16

Preparation of 1-lauroylamino-4,5-(and 4,8-)bis(m-chloroanilino)anthraquinone

A mixture of 120 parts of nitrobenzene, 31.3 parts of 1-amino-$\alpha$-dinitroanthraquinones (prepared by well known prior art procedure) and 26.2 parts of lauroyl chloride was stirred at 120°–130° C. for 1 hour; the mixture was then allowed to cool to room temperature. The solids were isolated by filtration, washed with nitrobenzene and then with methanol and dried. A yield of 16.4 parts of a chromatographically pure yellow intermediate was obtained.

A mixture of 99 parts of the yellow intermediate from above, 50 parts of m-chloroaniline, 4.24 parts of sodium carbonate and 3.3 parts of sodium acetate was stirred under nitrogen at 190° C. for 9½ hours. The reaction mixture was allowed to cool overnight and the solids were then isolated by filtration. The solids were reslurried in a mixture of 290 parts of water and 10 parts of sulfuric acid, then isolated by filtration. The blue material was washed well with water, then with ethanol and dried; yield was 7.2 parts; M.P. about 80° C.; $\lambda_{max.}$ 590 m$\mu$; $a_{max.}$ 26.0 liters gram$^{-1}$ cm.$^{-1}$. The expected structures were confirmed by mass spectroscopy.

EXPERIMENT 17

Preparation of a mixture of 1-benzamido-4,5-bis(m-trifluoromethylanilino)anthraquinone and 1-benzamido-4,8-bis(m-trifluoromethylanilino)anthraquinone A mixture of 10 parts of 1-benzamido-4,5- and 4,8-dinitroanthraquinones (as described in Experiment 15), 51 parts of m-aminobenzotrifluoride, 5.4 parts of sodium carbonate and 4.2 parts of sodium acetate was stirred for 31 hours at 155–165° C. The reaction mixture was cooled to 60° C. and excess m-aminobenzotrifluoride was removed by distillation. Forty parts of ethanol were added and the slurry was stirred for 1 hour. The gummy product was isolated by filtration and slurried in a mixture of 10 parts of 96% sulfuric acid and 300 parts of water for 1 hour. The solids were isolated by filtration, washed with ethanol, reslurried in hot ethanol, isolated by filtration and dried. Thin layer chromatography indicated only a trace of colored impurity in the blue dye which had an absorptivity of 20.8 liters gm.$^{-1}$ cm.$^{-1}$ at 588 m$\mu$. Based on the above, the dye product is a mixture of 1-benzamido-4,5 - bis(m-trifluoromethylanilino)anthraquinone and 1-benzamido - 4,8-bis(m-trifluoromethylanilino)anthraquinone.

The dye gives a reddish blue shade on 65/35 polyester/cotton blend fabric with good fastness to light, washing, drycleaning, crocking and sublimation.

EXPERIMENT 18

Preparation of a mixture of 1-(p-toluenesulfonamide)-4,5-di-(p-toluidino)anthraquinone and 1-(p-toluenesulfonamido)-4,8-di-(p-toluidino)anthraquinone One hundred parts of the dye mixture from Experiment 15 was heated under reflux for 7 hours with 13.2 parts of 85% aqueous potassium hydroxide in 465 parts of Cellosolve. The reaction mixture was cooled and the solids were isolated by filtration, yielding 41.8 parts of a mixture of 1-amino-4,5-di(p-toluidino)anthraquinone and 1 - amino-4,8-di(p-toluidino)anthraquinone. The mixture was predominantly the 4,8-isomer. Concentration of the filtrate yielded another 35 parts of isomeric mixture which was predominantly the 4,5-isomer.

A mixture of 21.7 parts of the aforesaid first crop of 1-amino-di(p-toluidino)anthraquinone from the above reaction, 31.4 parts of p-toluenesulfonyl chloride and 4.9 parts of pyridine was heated at 150° C. for 6 hours in 130 parts of o-dichlorobenzene. After allowing the reaction mixture to stand overnight, an additional 3 parts of p-toluenesulfonyl chloride and 1 part of pyridine were added and the reaction mixture was heated to 150° C. for 2½ hours. The mixture was cooled and the solids were isolated by filtration, washed with hot water and dried, yielding 14 parts of a dark red-blue solid, M.P. 245–248° C. The dye mixture had an absorptivity of 28.9 liters $cm.^{-1}$ $gm.^{-1}$ at 599 m$\mu$. High resolution mass spectroscopy confirmed that the dye product is a mixture of 1-(p-toluenesulfonamido)-4,5-di(p-toluidino)anthraquinone and 1-(p-toluenesulfonamido) - 4,8 - di(p-toluidino)anthraquinone. The dye mixture produced a reddish blue shade on 65/35 polyester/cotton blend fabric of good fastness to light, washing, drycleaning, crocking and sublimation.

The dyes employed in this invention can be applied to synthetic fibers alone by conventional aqueous or pad-heat procedures. The following shows the amenability of these dyes to the Thermosol process. "Dacron" polyester fabric was immersed for fifteen minutes at 82° C. in an aqueous bath containing 1% ether-alcohol sulfate surface active agent and 1% tetrasodium pyrophosphate. The fabric was rinsed in cold water, then padded at 40–50% pickup, based on dry fabric weight, in a dyebath containing:

|  | Grams |
|---|---|
| An aqueous blue dye paste (15%) active ingredient) containing the dye of Experiment 1 | 50 |
| Purified natural gum thickener | 20 |
| Water, to 1 liter. | |

The padded material was passed through an infrared predryer, then heated to and held at 213° C. for 90 seconds. The fabric was rinsed in water at 27° C., scoured for 5 minutes at 93° C. in water containing 1% ether-alcohol sulfate detergent, rinsed in water at 27° C. and dried. The polyester fabric was dyed a deep blue shade.

The following demonstrates the advantage of using the dyes employed in this invention in the Blackwell et al. process, as opposed to conventional vatting procedures, in the dyeing of cotton. A piece of cotton poplin was padded with an aqueous bath containing 50 grams per liter of a 15% aqueous dispersion of the dye of Experiment 1. Pickup was 50–60%. The fabric was dried and then padded with an aqueous solution containing caustic soda (45 grams per liter) and sodium hydrosulfite (45 grams per liter). The cloth was steamed for 30 seconds at 104° C. and rinsed. The cotton was then treated for 10 minutes in an aqueous solution of sodium perborate (25 grams per liter) at 49° C. Next, the material was soaped for 5 minutes at 93° C. in 2% oleate soap solution, rinsed thoroughly and dried. Finally, the blue tinted material was scoured in perchloroethylene at 50° C. for 5 minutes. Almost all of the color was removed from the fabric. In contrast to this as shown below in Example 2A, deep blue shades, fast to the perchloroethylene scour, were produced.

The following examples illustrate the preparation of the dyed fibers of this invention.

EXAMPLE 1

Dyeing 65/35 "Dacon" polyester/cotton blend fabric (A) A padbath was prepared from:

|  | Grams |
|---|---|
| An aqueous blue dye paste (15% active ingredient) containing the dye of Experiment 1 | 50 |
| Purified vegetable gum thickener | 20 |
| Methoxypolyethylene glycol (molecular weight 350) | 100 |
| Water, to 1 liter. | |

A continuous length of 65/35 "Dacron" polyester/cotton fabric was padded at 60% uptake, based on the weight of the fiber, and the padded fabric was passed at a rate of 2 yards per minute between two 1,000-watt infrared lamps (Fostoria-Fannon, Inc., Infrared Heater Model 6624), with each lamp shining on opposite surfaces of the fabric from a distance of about 3 inches. The continuously-moving fabric was passed through a circulating air oven at 80–100° C., with a hold-up time of one minute, and then through an oven at 200–210° C. with a hold-up time of 1.7 minutes. The hot, dry fabric was cooled to room temperature and rinsed for one minute each in sequence: in water at 20–30° C., in water at 90–95° C., at 90–95° C. in water containing 1% of an ether-alcohol sulfate detergent, in water at 90–95° C., and in water at 20–30° C. The material was dried and then scoured for 5 minutes in perchloroethylene at 50° C. Uniform deep blue shades of good balance and fastness were produced.

(B) Part A was repeated except that the heating was carried out as follows. The padded fabric was passed at a rate of 2 yards per minute between banks of infrared lamps, with one 1,000-watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C. where the total contact time was about 90 seconds.

(C) Part A was repeated except that the dye of Experiment 2 was employed. The polyester/cotton blend fabric was uniformly dyed a deep blue shade of good balance and fastness.

(D) Part C was repeated except that the heating was carried out as in Part B.

EXAMPLE 2

Dyeing cotton broadcloth (A) Example 1A was repeated except that a 100% mercerized cotton broadcloth was employed, the amount of glycol was increased to 150 grams, and the maximum temperature was reduced to about 180° C. The cotton cloth was dyed a deep, uniform blue shade of good fastness.

(B) Example 1B was repeated, employing the modifications recited in Part A.

EXAMPLE 3

Printing of 100% cotton fabric

A cotton fabric was padded to about 70% pickup with an aqueous solution containing 200 grams per liter of polyethylene glycol (M.W. 600). The padded fabric was heated at 160° C. for 5 minutes to evaporate water. The fabric was then printed in a pattern with a print paste prepared from:

|  | Grams |
|---|---|
| An aqueous blue paste (15% active ingredient) containing the dye of Experiment 3 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed in a blue shade.

EXAMPLE 4

Printing of 65/35 "Dacron" polyester/cotton blend fabric

Example 3 was repeated except that a 65/35 "Dacron" polyester/cotton fabric was employed and the maximum temperature was increased to 200° C.

The embodiments of the invention in which an exclusive property or privilege is claimed are defined as follows:

1. Uniformly dyed water swellable cellulosic fibers, said fibers being fast to light, washing, drycleaning, crocking and sublimation, said dyed fibers being produced by contacting water swellable cellulosic fibers sequentially or concomitantly with water, ethylene glycol or a derivative thereof and, while the fibers are still swollen, the non-vattable anthraquinone dye having the formula

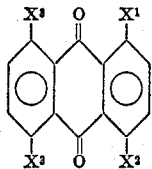

wherein $X^1$ is NHCO(D) or NHSO$_2$(D) wherein D is C$_{1-18}$ alkyl, naphthyl, unsubstituted phenyl or phenyl substituted with C$_{1-4}$ alkyl, C$_{1-4}$ alkoxy, Cl, Br, CF$_3$ or NO$_2$;

one of $X^3$ is H;

$X^2$ and the other $X^3$ contain 6–18 carbon atoms each and are selected from NH(alkyl), NH(cyclohexyl), N(alkyl)$_2$ and NH(R$^1$) wherein R$^1$ is unsubstituted phenyl or phenyl substituted with 1 to 3 substituents selected from (a) alkyl and alkoxy,
(b) F, Cl, Br, NHCO(alkyl) and NHCO(R$^2$) wherein R$^2$ is unsubstituetd phenyl or phenyl substituted with alkyl, alkoxy, halogen, CF$_3$ or NO$_2$, and
(c) R$^2$, OR$^2$, CF$_3$, CN, CONH$_2$, CONH(alkyl), CON(alkyl)$_2$, CONH(R$^2$), CONR$^2$(alkyl),

SO$_2$NH$_2$,

SO$_2$NH(alkyl), SO$_2$NH(R$^2$), SO$_2$N(alkyl)$_2$,

SO$_2$NR$^2$(alkyl),

CO(alkyl), CO(R$^2$), CO$_2$(alkyl), CO$_2$(R$^2$), SO$_2$(alkyl), SO$_2$(R$^2$) and N=NR$^2$ wherein R$^2$ is as defined in (b), provided that the total number of substituents from (b) shall not exceed two and from (c) shall not exceed one, and provided further that the 6-position of R$^2$ is substituted with H, or if the 2-position is substituted with C$_{1-2}$ alkyl, then with H or C$_{1-2}$ alkyl.

2. The fibers of claim 1 wherein the dye comprises 1-benzamido-4,5-bis(p-toluidino)anthraquinone.

3. The fibers of claim 1 wherein the dye comprises 1-(p-nitrobenzamido)-4,5-bis(p-toluidino)anthraquinone.

4. The fibers of claim 1 wherein the dye comprises 1-(p-anisylamino)-4,5-bis(p-toluidino)anthraquinone.

5. The fibers of claim 1 wherein the dye comprises 1-benzamido-4,8-bis(p-toluidino)anthraquinone.

6. The fibers of claim 1 wherein the dye comprises a mixture of 1-benzamido-4,5-bis(p-toluidino)anthraquinone and 1-benzamido-4,8-bis(p-toluidino)anthraquinone.

7. The fibers of claim 1 wherein the water swellable cellulosic fibers are cotton fibers.

8. The fibers of claim 1 blended or admixed with synthetic fibers.

9. The fibers of claim 8 wherein the synthetic fibers are polyester fibers.

References Cited

UNITED STATES PATENTS 3,473,882  10/1969  Weber et al. _____ 8—39
2,339,913  1/1944   Hanford _____ 8—120

FOREIGN PATENTS 1,147,110  4/1969   Great Britain.
  585,798  2/1947   Great Britain.
1,071,074  6/1967   Great Britain.
1,217,380  12/1970  Great Britain.

GEORGE F. LESMES, Primary Examiner

P. C. IVES, Assistant Examiner

U.S. Cl. X.R.

8—25, 39, 21 B; 260—378, 381, 371, 374